United States Patent [19]

Snowden

[11] 4,294,783

[45] Oct. 13, 1981

[54] SPINNING PROCESS AND APPARATUS

[75] Inventor: Paul Snowden, Redcar, England

[73] Assignee: Imperial Chemical Industries, Inc., London, England

[21] Appl. No.: 138,547

[22] Filed: Apr. 9, 1980

[30] Foreign Application Priority Data

Apr. 9, 1979 [GB] United Kingdom ............... 12359/79
Mar. 3, 1980 [GB] United Kingdom ............... 07084/80

[51] Int. Cl.³ .............................................. B29C 6/00
[52] U.S. Cl. ....................................... 264/8; 264/114; 425/8
[58] Field of Search ..................... 425/7, 8; 264/8, 164

[56] References Cited

U.S. PATENT DOCUMENTS

2,784,451 3/1957 Bowen ..................................... 65/14
3,055,049 9/1962 Bruyne et al. ........................ 425/225

FOREIGN PATENT DOCUMENTS

38-4703 4/1963 Japan ...................................... 264/8
46-30966 9/1971 Japan .................................. 425/464

Primary Examiner—Jay H. Woo
Attorney, Agent, or Firm—Cushman, Darby & Cushman

[57] ABSTRACT

Process and apparatus for centrifugally spinning a fibre-forming material, e.g. a urea-formaldehyde resin, in which the fibre-forming material is supplied in liquid form to the interior of a spinning cup wherein it is divided into separate streams which are led to the outlets of passages through the wall of the spinning cup.

3 Claims, 14 Drawing Figures

SPINNING PROCESS AND APPARATUS

This invention relates to a spinning process and in particular to centrifugal spinning of fibres and to a spinning cup for use therein.

In a centrifugal spinning process the fibre-forming material is fed to the interior of a rapidly rotating wheel or cup, usually rotating about a vertical axis; the fibre-forming material flows, by virtue of centrifugal force, to the interior wall of the cup from whence it is spun as fibres from the outlets of passages through the cup wall.

Where the fibre-forming material is spun from the outlets of passages provided through the wall of the cup, normally there are regions of the interior wall of the cup between the inlets of adjacent passages. Where the interior wall is of cylindrical configuration, we have found that such regions are undesirable as, inter alia, they permit some hold up of the fibre-forming material which may, depending on the nature of the fibre-forming material, degrade and/or tend to solidify. Such accumulation of the fibre-forming material is thus undesirable as periodically portions thereof may leave the so formed "dead spot" and be spun through the passages. This can lead to shot and/or fibres of inferior properties. Furthermore the regions of the cylindrical interior wall of the cup between adjacent passages permit the fibre-forming material to travel further on the cup wall giving rise to the possibility of spinning from the side of the passage outlet instead of from the top or bottom thereof or, in extreme cases, accumulation of the fibre-forming material in the cup beyond the passages, i.e. on the end of the cup, if the latter has a closed end. Where the end is not closed, such fibre-forming material passing along the cylindrical cup interior wall between the passages may be spun from the rim of the cup again giving rise to the possibility of shot and/or fibres of different characteristics to those spun through the passages.

We have found that these disadvantages can be overcome by dividing the fibre-forming material into separate streams and feeding all the material in each stream to a passage through the cup wall from the outlet of which it is spun.

Accordingly we provide a process for the centrifugal spinning of fibres comprising feeding fibre-forming material in liquid form to the interior surface of a rapidly rotating hollow spinning cup provided with a plurality of separate passages positioned around and extending through its circumferential wall from the interior surface of the cup, dividing all of the fibre-forming material on the interior surface of the cup into a plurality of separate streams, feeding all of the fibre-forming material in each of the said streams to a passage whereby said fibre-forming material is spun as fibres from the outlets of said passages, and collecting the resultant fibres.

We also provide a centrifugal spinning cup comprising a hollow cylinder having a plurality of discrete passages positioned around and extending through its circumferential wall from the interior surface of said cylinder, means to divide all of the fibre-forming material supplied in liquid form to the interior surface of said hollow cylinder into a plurality of separate streams in the interior of said cylinder, and means to lead all of the fibre forming material in each stream to the outlet of the passage associated with that stream.

In the ensuing description the cup is described as if its axis of rotation is vertical and with the fibre-forming material flowing down the interior wall of the cup to the passages. It will be appreciated, however, that the cup may also be operated the other way up with the material flowing up the interior wall of the cup to the passages or with the cup axis horizontal or at any intermediate angle.

The passages may be holes drilled or cut through the cup wall.

In the invention means are provided to divide the fibre-forming material into a plurality of streams, all the material in each of which is fed to a passage and spun from the outlet thereof. These dividing means may simply be formed by arranging that adjacent passages, where they commence, i.e. at their inlets, are contiguous, i.e. touching, so that fibre-forming material flowing towards the passages is directed into one or other of the passages or else there may be separate flow dividing means, e.g. channels, which lead to the passages.

In a preferred form of the invention, the flow dividing means comprises a series of projections on the interior cylindrical wall of the cup having pointed or rounded ends which divide the fibre-forming material into separate streams which flow, between adjacent projections, to the inlets of the passages Said projections preferably extend parallel to the axis of rotation of the cup. Preferably the projections are parallel sided and have a width equal to the distance between adjacent passage inlets so that the portions of the cylindrical interior surface of the cup between the projections are parallel sided and of width equal to the width of the passage inlets.

In this way, the fibre-forming material flowing over the interior surface of the cup is divided, by the flow dividing means, into separate streams which then flow over said parallel sided portions of the interior cylindrical wall of the cup before entering the passages. This enables any irregularities in the thickness of the stream of fibre-forming material, e.g. as caused by the flow division, to be smoothed out by the centrifugal force exerted on the fibre-forming material as it flows over the portion of the cylindrical interior surface of the cup.

While the passage outlets are preferably equidistantly spaced around the circumference of the cup, in some cases, particularly when a large number of passages are employed, it may be necessary to interrupt the regular array of passage outlets, e.g. by omitting one or more passages to allow space for, e.g. bolt holes, fastening the cup components together. In this case it is preferred that preliminary flow dividers are employed, equal in number to, and positioned to correspond to, the interruptions in the array of outlets, to divide the fibre-forming material into a number of primary streams which are then subdivided into the streams fed to each passage. It is again preferred that such preliminary flow dividers are positioned to permit flow of the fibre-forming material in parallel sided streams over portions of the interior wall of the cup between said preliminary flow dividers before subdivision so that the centrifugal force exerted on the fibre-forming material by rotation of the cup can even out any irregularities in the thickness of these primary streams caused by the preliminary flow dividers.

For the fibre-forming material to be spun as fibres rather than as a film or ribbon, it is desirable that there are provided means to direct the fibre-forming material towards the top of the passage outlet. These means may simply be provided by inclining the passages to the horizontal with the outlet point lower than the inlet of the passages so that fibre-forming material entering the passages away from the top thereof will tend, by virtue of the centrifugal force exerted on the fibre-forming material as it is spun, to flow horizontally, and hence towards the top of the passages at the outlet thereof.

Thus fibre-forming material entering the passages down the sides thereof tends to flow essentially horizontally under the action of the centrifugal force and is thus directed towards the top of the passage at the outlet thereof. Alternatively and/or additionally, the flow dividing means may direct the fibre-forming material to the top of the passages (which may be inclined to the horizontal if desired).

For some fibre-forming materials, as will be described hereinafter, it is desirable that a stream of gas, usually air, is also thrown out of the cup to entrain the fibres and to transport them away from the cup. In such a process the passage size, gas flow rate, fibre-forming material feed rate, and rotational speed of the cup are arranged such that the fibre-forming material does not fill the passage but flows therethrough on the upper surface thereof, the rest of the passage being available to allow throughflow of the fibre entraining gas. At the passage outlet, the fibre-forming material is spun off the cup and is entrained in the gas stream flowing through the passages. This gas stream may serve to attenuate the fibres and/or cause them to solidify and/or transport them to a collection zone.

In one form of the invention, the passages may be arranged such that the inlet to the passages is of greater width than the width of the passage outlet.

Thus the passages may taper in width, converging from the interior of the cup to the exterior. This taper may be continuous or there may be an initial portion diminishing in width leading to a parallel sided portion nearer to the passage outlet. This tapering in width of the passages has the advantage that it enables the passage outlets to be more widely spaced thus reducing the possibility of fibres spun from adjacent outlets adhering or entangling with one another.

It will be appreciated that, if the inlets of adjacent passages are contiguous, e.g. meet at a knife-edge, then these knife edges between adjacent passages can act as the flow dividers. It is possible, in some cases, to arrange that adjacent passages of constant width are contiguous e.g. by making the passage outlets sufficiently large and/or using sufficiently long passages. However, the use of long passages requires a thick cup wall which increases the cup mass, and hence inertia, and so increases the power requirement for cup rotation. Increase in the passage outlet width is likewise disadvantageous as it may cause fibres spun from the outlets of adjacent passages to adhere and/or entangle with one another and may also increase the gas flow rate required to achieve satisfactory entrainment of the fibres, as well as increasing the dimension of the fibres by virtue of the greater width of fibre-forming material at the passage outlet from which the fibres are spun. We therefore prefer to employ separate flow-dividing means and/or passages that taper in width.

It will further be appreciated that where the passages are contiguous and/or separate flow-dividing means are employed, in order to divide the flow of fibre-forming material the flow-divider, e.g. the contiguous inlets to passages, need not have a knife edge but instead that edge may be rounded to provide a convex surface to divide the fibre-forming material to one or other of the passages. The passages may be of any suitable cross section e.g. rectangular, circular or V-shaped.

Where the passages taper in width, there is a tendency for an increased amount of the fibre-forming material to be spun from the regions adjacent the circumferential extremities of the passage outlet compared with that spun from the surface of the passage outlet between its circumferential extremities. This is liable to give rise to uneven fibres and/or shot. This is because fibre-forming material entering the passage is caused to flow radially outwards by the centrifugal force and so, while some fibre forming material can flow radially direct from the inlet to the outlet of the passage, fibre-forming material entering the inlet nearer to the circumferential extremities of the inlet will, as it flows radially outwards, be deflected from the radial direction of flow by the tapered passages walls and so will flow along the walls to the circumferential extremities of the outlet.

We therefore prefer that, where tapered passages are used, whether or not they are continuously tapered or have an initial tapered portion followed by a parallel sided portion nearer to the outlet, each passage is skewed so that its outlet is displaced circumferentially from its inlet to such an extent that the radii from the axis of the cup to the circumferential extremities of the passage outlet do not pass between the circumferential extremities of the passage inlet. In this way all the fibre-forming material entering the passage will, as it flows radially outwards, be deflected from the radial direction of flow by one of the passage walls and so will flow along that wall and be spun from one of the circumferential extremities of the passage outlet. Where the passages are of constant width, i.e. parallel sided, they may also be so skewed to ensure spinning takes place from one circumferential extremity of the passage outlet.

The invention is of particular utility in the formation of fibres from solutions of plastics materials, particularly thermosetting resins. In such a solution spinning process, the resin, dissolved in a suitable solvent, is spun from the rotating cup. The fibre is stabilised by evaporation of the solvent, and, where the resin is thermosetting, may additionally be assisted by curing of the resin. In order to permit the fibres spun from the outlets to be attenuated to the desired degree it is often desirable with such solvent spinning systems to delay evaporation of the solvent and/or curing of the resin. This may be achieved by blowing a gas, e.g. air, out through the outlets with the fibres, the gas being in such a state that evaporation of the solvent and/or curing is retarded. For example, where the solvent is water and the resin cures under the action of heat, cool humid air may be used to permit the desired degree of attenuation of the fibres.

Once the fibres have been attenuated to the desired degree, they may be contacted with a heated gas stream to evaporate the solvent and/or to cure the fibres.

Equally, where the fibre-forming material is spun as a melt, e.g. as in the formation of glass fibres, a heated gas stream may be blown out of the outlets to maintain the fibre in the molten state while attenuation occurs.

The invention is of particular utility in the formation of fibres from aqueous solutions of thermosetting resins such as urea, melamine and/or phenol formaldehyde resins. To effect curing of the resins a catalyst solution, e.g. an acid such as sulphuric or phosphoric acid or an ammonium salt such as ammonium sulphate or diammonium hydrogen phosphate is added to the resin prior to spinning. Often a spinning aid such as a water soluble polymeric material, for example poly(vinyl alcohol) or poly(ethylene oxide) is added along with the catalyst solution.

The rotational speed of the cup will usually be in excess of 1000 rpm, typically 3000 to 15000 rpm.

Various embodiments of the invention will now be described with reference to the drawings wherein.

Figure 4:
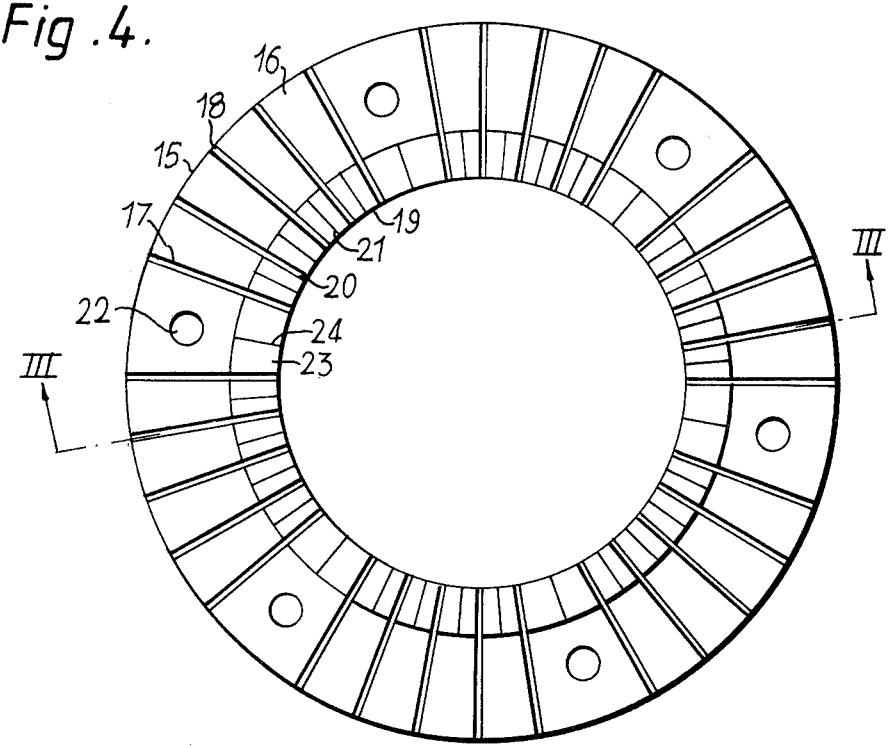
FIG. 4 is a plan view of the ring member 15 of the embodiment of FIG. 3. The line III—III in FIG. 4 corresponds to the line of the section of FIG. 3.
Figure 6:
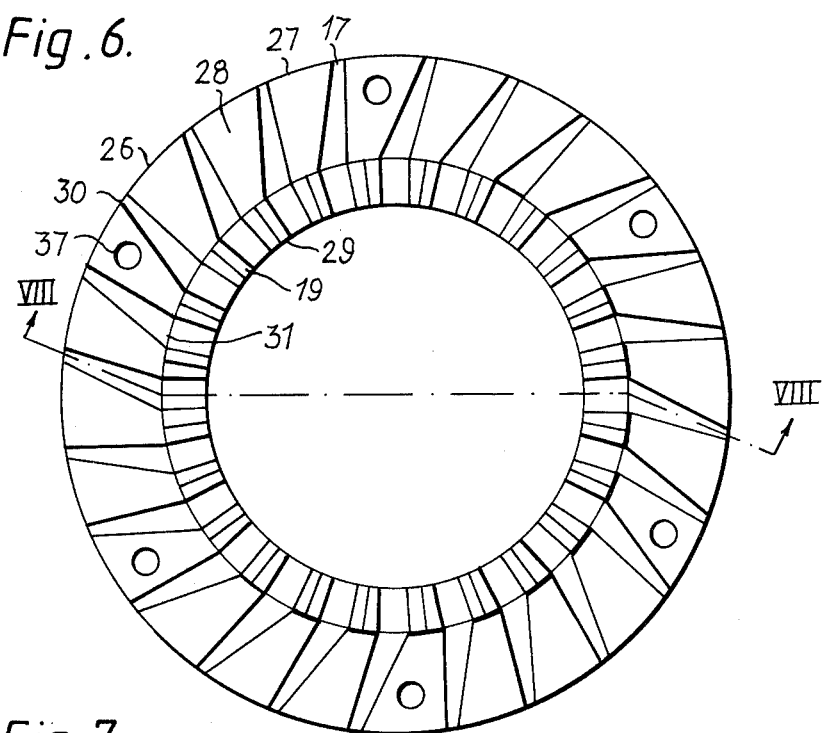
Figure 7:
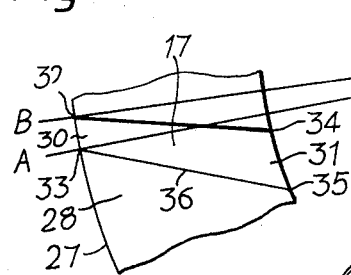
Figure 8:
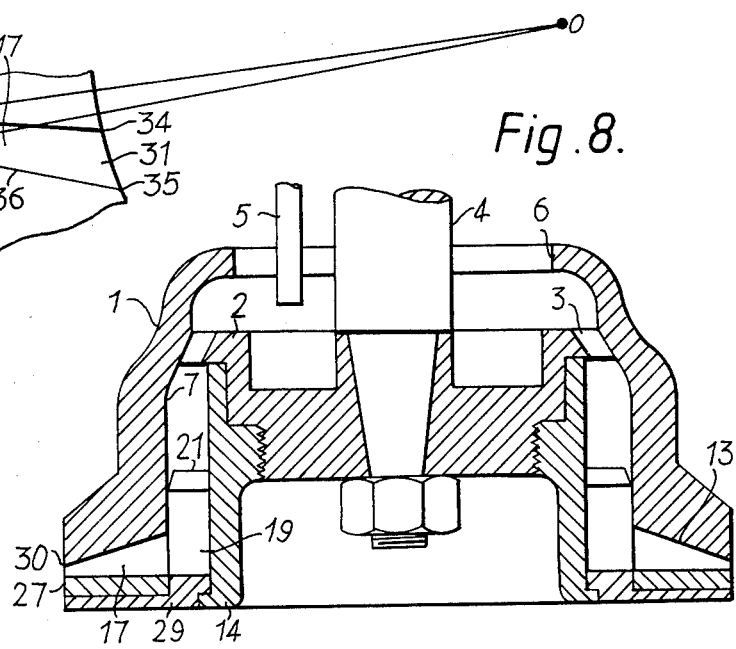
Figure 9:
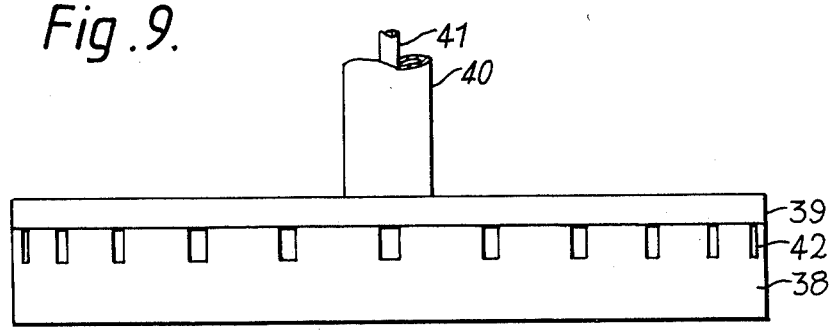
Figure 10:
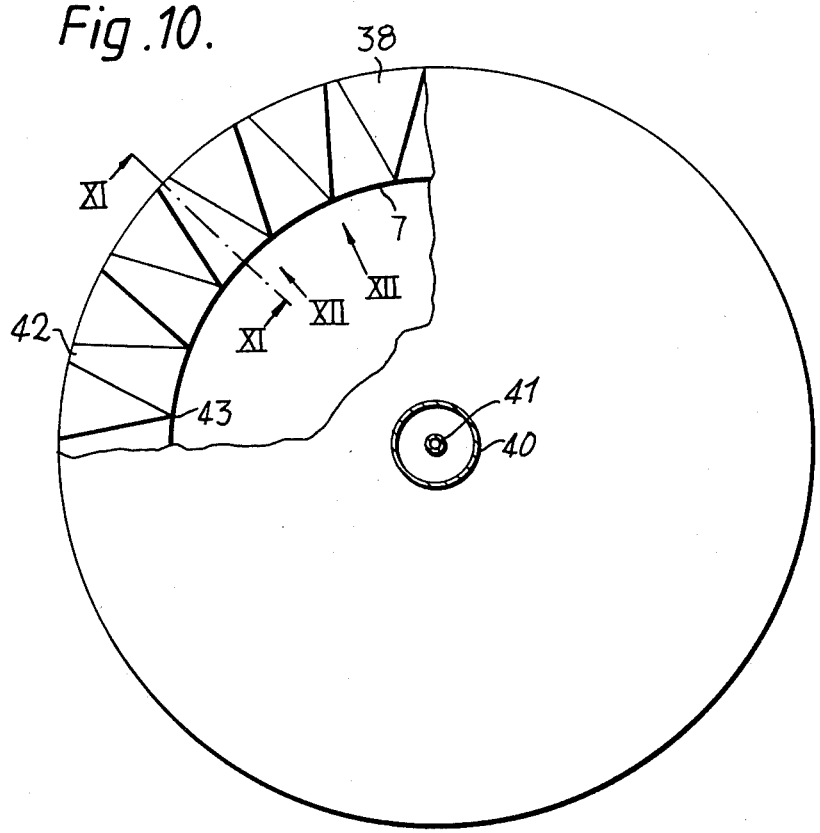
Figure 11:
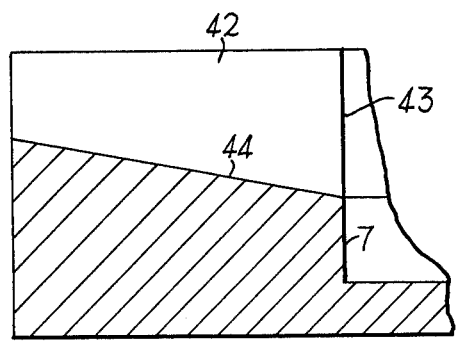
Figure 12:
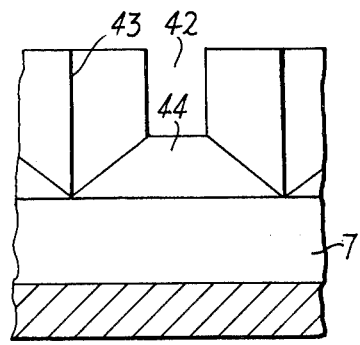
Figure 13:
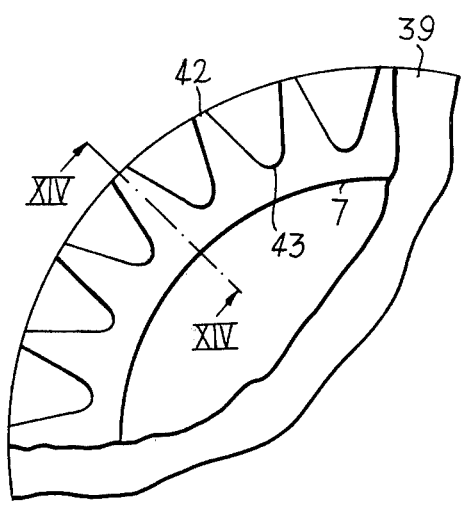
Figure 14:
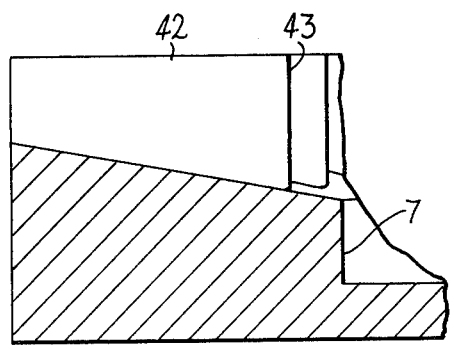

FIG. 6 is a plan view similar to FIG. 4 of a ring assembly 26 of a cup of a third embodiment, FIG. 7 is an enlargement of part of the outer ring member 27 of FIG. 6, FIG. 8 is a cross section of a cup of the third embodiment. The section corresponds to line VIII—VIII of FIG. 6, FIG. 9 is an elevation of a spinning cup of a fourth embodiment, FIG. 10 is a plan view from above of the cup shown in FIG. 9 with part of the upper member cut away, FIG. 11 is a section along line XI—XI of FIG. 10, FIG. 12 is an elevation of part of the interior surface of the cup viewed in the direction of the arrows XII—XII shown in FIG. 10, FIG. 13 is a view similar to part of FIG. 10 showing a modification of the fourth embodiment, and FIG. 14 is a section along the line XIV—XIV of FIG. 13.

Figure 1:
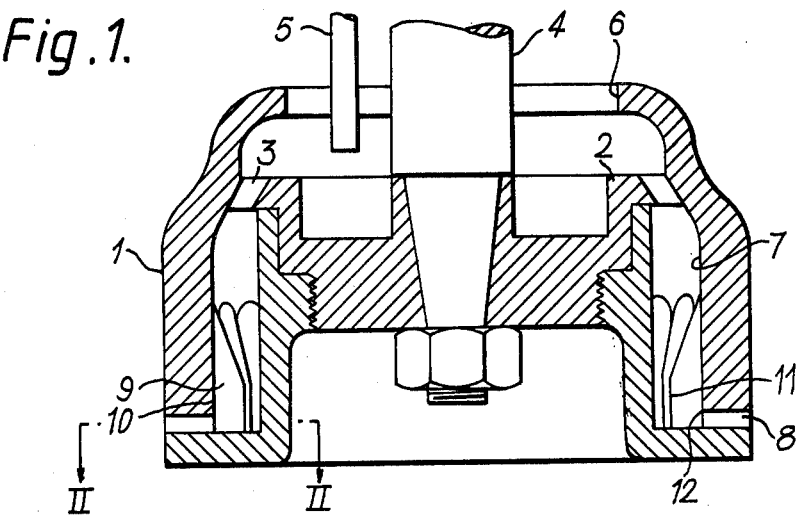
FIG. 1 is a cross section of a spinning cup of a first embodiment.

In the embodiment shown in FIG. 1, the spinning cup assembly comprises a cup 1 of generally hollow cylindrical form having a closed lower end. Inside the cup, and integral therewith, is a member 2 provided with a plurality of holes 3. Typically there are 24 holes 3 spaced equidistantly round member 2. Member 2 divides the cup into upper and lower regions. Connected concentrically with member 2 is a vertical drive shaft 4 by which the cup can be rotated. A fibre-forming material feed supply tube 5 is provided between the drive shaft 4 and the inner rim 6 of the upper region of the cup. Provided in the lower limb 7 of the cup wall are a plurality of passages 8 spaced equidistantly round the circumference of the cup wall in the form of holes of constant circular cross section bored through the cup wall. The number of passages will depend on a variety of factors, including, inter alia, their size and the diameter of the cup. We prefer that there are at least 6 passages and in particular that there are at least 12 passages. Typically a cup of diameter about 12 cm may have 24 passages of 3 mm diameter.

In this embodiment, the interior wall 7 of the cup is inwardly flared in the region of passages 8, and this flaring is cut away by a number, equal to the number of passages 8, of vertical grooves 9, forming flow-dividing channels, positioned and of such a size that their bottoms 10 communicate with passages 8 while their inward extremities 11 are contiguous, i.e. meet at a knife edge, at a point above the top 12 of the interior end of passages 8.

In use the fibre-forming material is fed from the feed tube 5 into the upper region of the cup from whence it passes through perforations 3 into the lower region of the cup. A stream of gas is supplied, by means not shown, to the upper region of the cup through the space between drive shaft 4 and the inner rim 6 of the upper region of the cup. This gas stream passes through perforations 3 in member 2 into the lower region of the cup. The centrifugal force generated by rotation of the cup forces the fibre-forming material to the interior wall 7 of the cup where it flows downwards as a film. This film is divided by the inwardly extending projections, formed by the portions of the interior cup wall between grooves 9, into separate streams each of which is fed to the inlet of a passage 8. Because of the inwardly extending nature of these projections, the fibre-forming material will tend towards the bottoms 10 of grooves 9 and thence to the tops 12 of passages 9. Hence the fibre-forming material will tend to be spun from the top of the outlets of passages 8. The gas fed to the lower region of the cup is also thrown out of the cup through passages 8.

Figure 2:
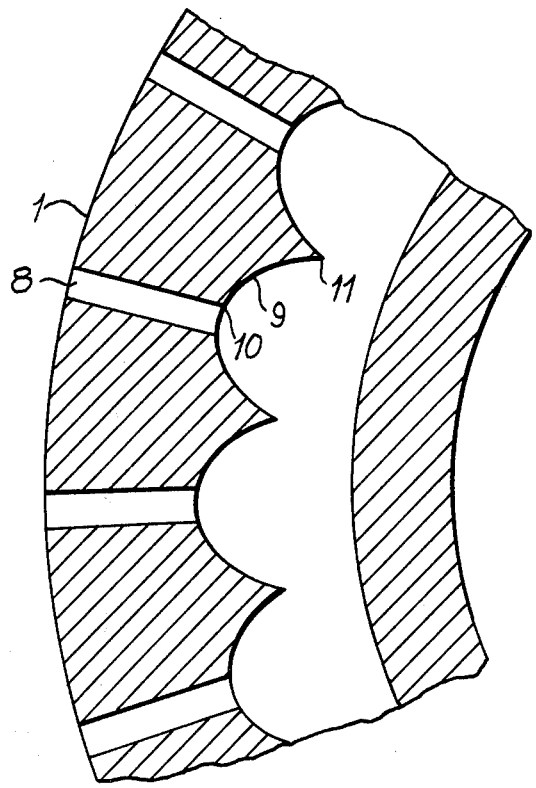
FIG. 2 is a section along line II—II of FIG. 1.
Figure 3:
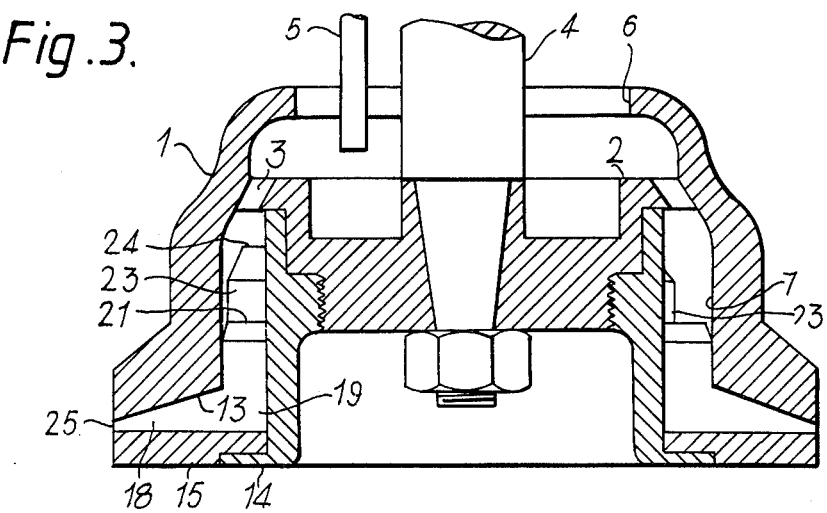
FIG. 3 is a cross section similar to FIG. 1 showing a cup of a second embodiment.
Figure 5:
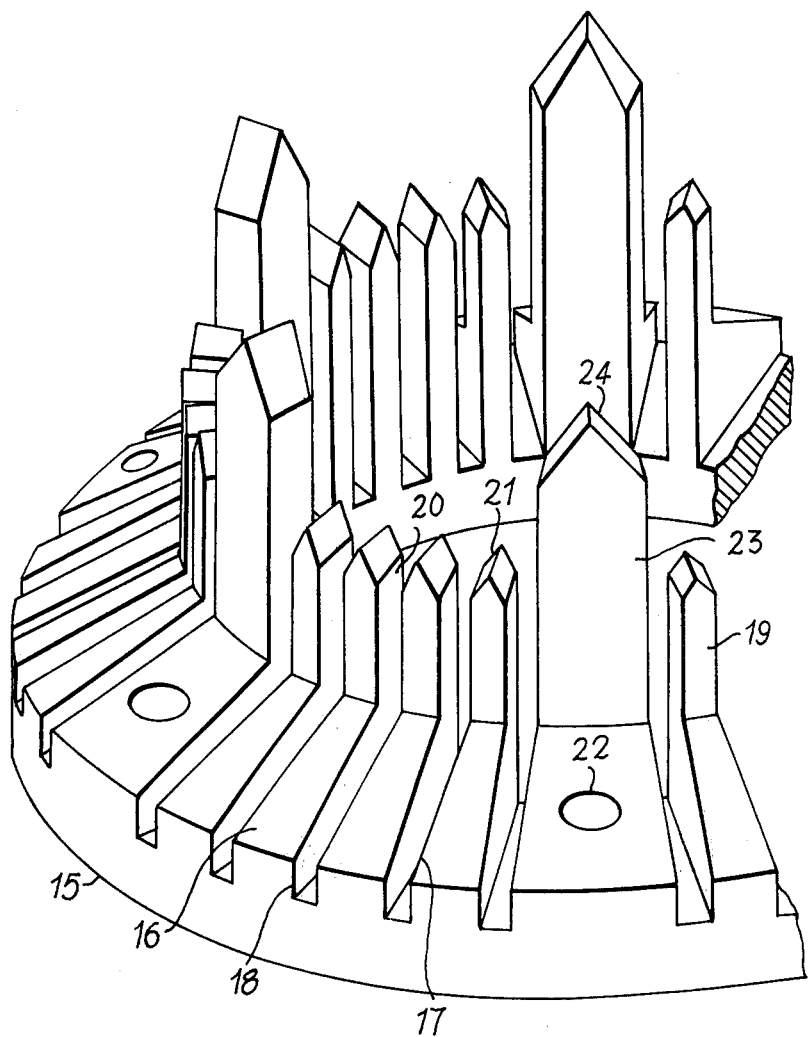
FIG. 5 is an isometric view of the ring member shown in plane in FIG. 4.

In a second embodiment of the invention illustrated by FIGS. 3-5, the cup of the embodiment of FIGS. 1 and 2 is modified in that the interior wall 7 of the cup is not inwardly flared but the lower end 13 thereof is bevelled. Between the end of wall 7 of the cup and a member 14 forming the bottom of the cup is located a tiara-like ring member 15 which is shown separate from the rest of the cup in FIGS. 4 and 5. The tiara-like member has an upper surface 16 bevelled to mate with the bevelled end 13 of the cup wall. Radially extending, parallel sided, slots 17 are milled in the bevelled surface 16 to provide the passages 18 from the interior to the exterior of the cup. Typically, for a cup of diameter 12 cm, the slots 17 may have a width of 1-2 mm. Between each slot 17 at the interior of the ring is an upwardly extending projection 19 having parallel sides 20 and a pointed apex 21. The distance between each projection 19 is equal to the width of the slots 17. The diameter of the cylinder described by the exterior surfaces of projections is equal to the diameter of the cylindrical interior wall 7 of the cup so that the exterior surfaces of projections 19 fit tightly against the cup interior wall 7.

The tiara-like ring member 15 is held in place on the cup by means of bolts (not shown) passing through holes 22 spaced at 60° intervals round the ring and extending through the bevelled surface 16. To make provision for these bolt holes 22, the array of slots 17 round the ring is interrupted by omitting a slot at each bolt location. Thus if there are 6 evenly spaced bolt holes 22, a typical arrangement would employ a total of 30 slots, the slots being spaced at 10° intervals between each bolt hole 22. The projection 23 between the slots 17 on either side of a bolt hole 22 is longer than the other projections 19 so that fibre-forming material flowing down the interior wall 7 of the cup first encounters the pointed ends 24 of the elongated projections 23 and is thus divided into primary streams which continue to flow down the cup wall 7 between adjacent elongated projections 23. These primary streams are then subdivided by the pointed ends 21 of the remaining projections 19 and the resultant streams then flow down the cup wall 7 between adjacent projections 19. As the streams flow down the cup wall 7 between the parallel sides of the adjacent projections, irregularities in the thickness of the film of fibre-forming material may be evened out. The fibre-forming material then flows over the bevelled end 13 of the cup along the line of each slot 17 and is spun from the exterior edge 25 thereof.

In the third embodiment, which is a modification of the second embodiment and is illustrated in FIGS. 6–8, the tiara-shaped ring member 26 is formed of two components, firstly a ring 27 having a bevelled surface 28 mating with the bevelled end 13 of the cup, and secondly a ring 29 bearing the projections 19. In this embodiment the slots 17 are cut in ring 27 and are tapered in width so that they narrow from the interior to the exterior of the ring 27. The slots 17 are also skewed so that the outlets 30 thereof are circumferentially displaced from their inlets 31. The amount of skew is such that the radii OA, OB (see FIG. 7) from the axis O of the cup through the circumferential extremities 32, 33 of the slot exit 30 do not pass between the circumferential extremities 34, 35 of the slot inlet 31.

In this embodiment, the fibre-forming material entering the slot 17 flows radially outwards until it is deflected from the radial flow direction by the wall 36 of the slot. The fibre-forming material is thus spun from the extremity 33 of the outlet 30 that is circumferentially the nearer to the inlet extremities.

In this embodiment as illustrated the array of slots is uninterrupted and so the elongated projections 23 used in the second embodiment are not required. The components are fastened together by bolts passing through holes 37 between adjacent slots 17.

In the fourth embodiment of the invention illustrated by FIGS. 9–12 an inverted system is employed where the cup is arranged so that the fibre-forming material flows up, rather than down, the interior wall of the cup.

In this embodiment, the cup comprises a hollow cylindrical vessel 38 having a lid 39 fastened thereto by means not shown. The cup can be rotated about its vertical axis by means of a hollow drive shaft 40 fastened to, and extending through, lid 39. The hollow drive shaft 40 also serves as a gas stream supply tube and mounted coaxially therein is a fibre-forming material supply tube 41.

A plurality of passages 42 are provided through the cup wall. The number of passages will depend on, inter alia, their size and the diameter of the cup. Again we prefer that there are at least 6, and in particular at least 12, passages. In this embodiment, the passages are tapered and so, while the cross section of the passages may be circular or elliptical, for ease of manufacture they are preferably polygonal, particularly triangular or rectangular. In the arrangement shown they are rectangular. As an example a cup of diameter about 12 cm may have 24 passages of outlet dimentions 3 mm width and 5 mm height.

The passages 42 through the cup wall taper in width so that their inlets have a greater width than their outlets. The degree of taper is such that, at the interior wall 7 of the cup, adjacent passages are contiguous, i.e. meet at a knife edge 43.

As shown in FIGS. 11 and 12, the lower surface 44 of the passages 42 is inclined upwards so that the bottom of the passage outlet is above the bottom of the passage inlet. This inclined surface 44 assists the gas stream passing through the passage 42 to smooth out any irregularities in the film of fibre-forming material flowing up the interior wall 7 of the cup and over the surface 44 and also, since any material flowing into the passages 42 along the side walls thereof will tend to flow horizontally by virtue of the centrifugal force, this flow of fibre-forming material is concentrated on to surface 44 at the passage outlet.

It will be appreciated that the top of the passages 42 is formed by the underside of lid 39.

In the modification shown in FIGS. 13 and 14, the junctions 43 between adjacent passages 42 are positioned outwardly of the interior wall 7: this enables the film of fibre-forming material to be smeared out by the gas stream before it is divided into separate streams by passage 42. In this modification the junction 43 between adjacent passages 42 is rounded, instead of being a knife edge.

Setting back of the junction between adjacent passages outwardly of the continuous interior wall 7 of the cup, as shown in FIGS. 13 and 14, also eases manufacture where a rounded, as opposed to knife edge, junction between adjacent passages 42 is required.

It will be appreciated that the tapered passages 42 may be skewed as in the third embodiment described above.

I claim:

1. A process for the centrifugal spinning of fibres, utilizing the centrifugal spinning cup comprising a hollow cylinder with a plurality of discrete passages positioned around and extending through its circumferential wall from the interior cylindrical surface of the cup, the inlets to the passages being wider then the outlets and contiguous so that all the fibre-forming material flowing over the interior cylindrical surface from the supply region towards the inlets is directed, by the contiguous passage inlets, into the passages; said method comprising the steps of:

supplying a fibre-forming material in liquid form to the interior cylindrical surface at an area axially spaced from the passages so that the material must flow over a portion of the interior cylindrical surface before reaching the passages;

dividing all the fibre-forming material into a plurality of separate streams at the contiguous inlets of the passages, the fibre-forming material flowing into the passages;

rapidly spinning the cup; and collecting formed fibres from the passages.

2. A centrifugal spinning cup comprising:

a hollow cylinder having a plurality of discrete passages positioned around, and extending through, its circumferential wall from the interior cylindrical surface of the cup;

means for supplying a fibre-forming material in liquid form to said interior cylindrical surface at a supply region axially spaced from inlets to said passages along the length of said interior cylindrical surface;

said interior cylindrical surface comprising surface means for ensuring that all fibre-forming material must flow thereover before reaching said passage inlets; and each passage having an inlet and an outlet, and said inlets being wider than said outlets and contiguous, so that all the fibre-forming material flowing from the supply region toward said inlets is directed by said contiguous passage inlets into said passages.

3. A centrifugal spinning cup according to claim 2 wherein each passage is skewed so that its outlet is displaced circumferentially from its inlet to such an extent that the radii from the axis of the cup to the circumferential extremities of the passage outlet do not pass between the circumferential extremities of the passage inlet.

* * * * *